United States Patent [19]

Austruy et al.

[11] Patent Number: 4,485,436
[45] Date of Patent: Nov. 27, 1984

[54] SYSTEM FOR SELECTING INTERFACES ON A PRIORITY BASIS

[75] Inventors: Pierre Austruy, Nice; Gerard Dalboussiere, LaColle, both of France

[73] Assignee: International Business Machines Corporation, Armonk, N.Y.

[21] Appl. No.: 295,182

[22] Filed: Aug. 21, 1981

Related U.S. Application Data

[63] Continuation of Ser. No. 81,420, Oct. 3, 1979, abandoned.

[30] Foreign Application Priority Data

Nov. 30, 1978 [FR] France ............................ 78 34432

[51] Int. Cl.³ .............................................. G06F 9/18
[52] U.S. Cl. ............................................... 364/200
[58] Field of Search ........................... 364/200, 900

[56] References Cited

U.S. PATENT DOCUMENTS

| | | | |
|---|---|---|---|
| 3,331,055 | 7/1967 | Betz | 364/200 |
| 3,735,357 | 5/1973 | Maholick | 364/200 |
| 3,983,540 | 9/1976 | Keller et al. | 364/200 |
| 4,159,518 | 6/1979 | Draper et al. | 364/200 |

Primary Examiner—Raulfe B. Zache
Assistant Examiner—David Y. Eng
Attorney, Agent, or Firm—John B. Frisone

[57] ABSTRACT

Adapter interfaces (ADAPT) and line driver interfaces (RDVP and RDVC) are divided into subgroups within a pyramid type of architecture. Each subgroup is provided with independent preselection means for determining the path through the pyramid from the CCU BUS to the adapter to be serviced first.

6 Claims, 4 Drawing Figures

SYSTEM FOR SELECTING INTERFACES ON A PRIORITY BASIS

This application is a continuation of application Ser. No. 081,420 filed Oct. 3, 1979, now abandoned.

BACKGROUND OF THE INVENTION

(1) Field of the Invention

This invention relates to an improved system for selecting interface circuits on a priority basis and applies, in particular, to communication controllers. More particularly, the invention relates to means for controlling the transfers of data via adapters on a priority basis.

(2) Description of the Prior Art

Modern communication controllers are devices intended to be used in data teleprocessing systems to control transmissions over the various lines connected thereto as well as the execution of certain teleprocessing functions. In many installations, the teleprocessing network is controlled by one or more central processing units (CPUs) containing a directory of the rules that govern the processing of data sent to or from the terminal stations in the network. The transmission and reception of data via the transmission lines (which may be physical lines or microwave links) is handled by communication controllers operating under the control of the CPU(s). However, in addition to executing transmission commands, the communication controller performs other functions included in the directory, particularly those which are directly associated with standard transmission procedures. As a result, the CPU is relieved of the responsibility of performing such functions and can concentrate on other tasks.

The communication controller is, therefore, an intelligent, relatively complex device. Its intelligence is mainly concentrated in one or more central control units (CCUs) connected to the terminals through line adapters, and to the CPU(s) through channel adapters. Whenever an adapter needs to transfer data, it initiates a request for service and waits for an answer from the CCU for authorization to transmit the data.

All tasks to be processed by the adapters are not of equal urgency and are therefore assigned different priority levels which levels are represented by binary data. Control of the adapters is a relatively simple matter where each adapter processes only tasks that have the same level of priority as it is only necessary in that case to identify those adapters which are making requests for service to determine which adapter will be serviced first when a selection command is received from the CCU.

However, this is not always feasible because the architecture of the teleprocessing systems often requires that tasks with different priority levels be processed by the adapters. In such cases, the adapters may be combined into groups each provided with auto-selection means such that whenever the CPU wants to communicate with the terminals the adapters belonging to a group can interrogate each other to determine which of them is to respond first. However, this auto-selection process is not instantaneous and involves a time delay which is detrimental to the performance of the controller.

It should be noted that, although this specification deals mainly with adapters and communication controllers, the principles of the present invention apply to any set of interface devices or circuits between a central processing unit and components that make requests for services to which different priority levels have been assigned.

To overcome the above difficulties, it has been proposed in U.S. Pat. No. 4,296,463 issued Oct. 20, 1981, and assigned to the same assignee as this application, to perform a preselection operation before the selection proper. The preselection process is carried out in an asynchronous manner quasi-independently of the CCU to enable the adapters belonging to a given group to interrogate each other, with no significant intervention on the part of the CCU, and to designate the adapter that will be serviced first when a selection command is received from the CCU. This scheme works well where the duration of the preselection cycle is relatively short. However, such is not the case where the adapters involved are numerous and/or remote from each other and where provision must be made for control (or interface) circuits to drive the lines interconnecting the adapters and the CCU. If the time interval between the start of the preselection process and the receipt of the selection command is too short for such process to be completed, then the system becomes unstable and cannot work.

It is an object of the present invention to provide a system for asynchronously preselecting adapters to be serviced on a priority basis, which system minimizes the potential instability that may result from the time interval required to perform the preselection operations.

The foregoing and other objects, features and advantages of the invention will be apparent from the following more particular description of a preferred embodiment of the invention, as illustrated in the accompanying drawings.

DISCLOSURE OF THE INVENTION

Figure 1:
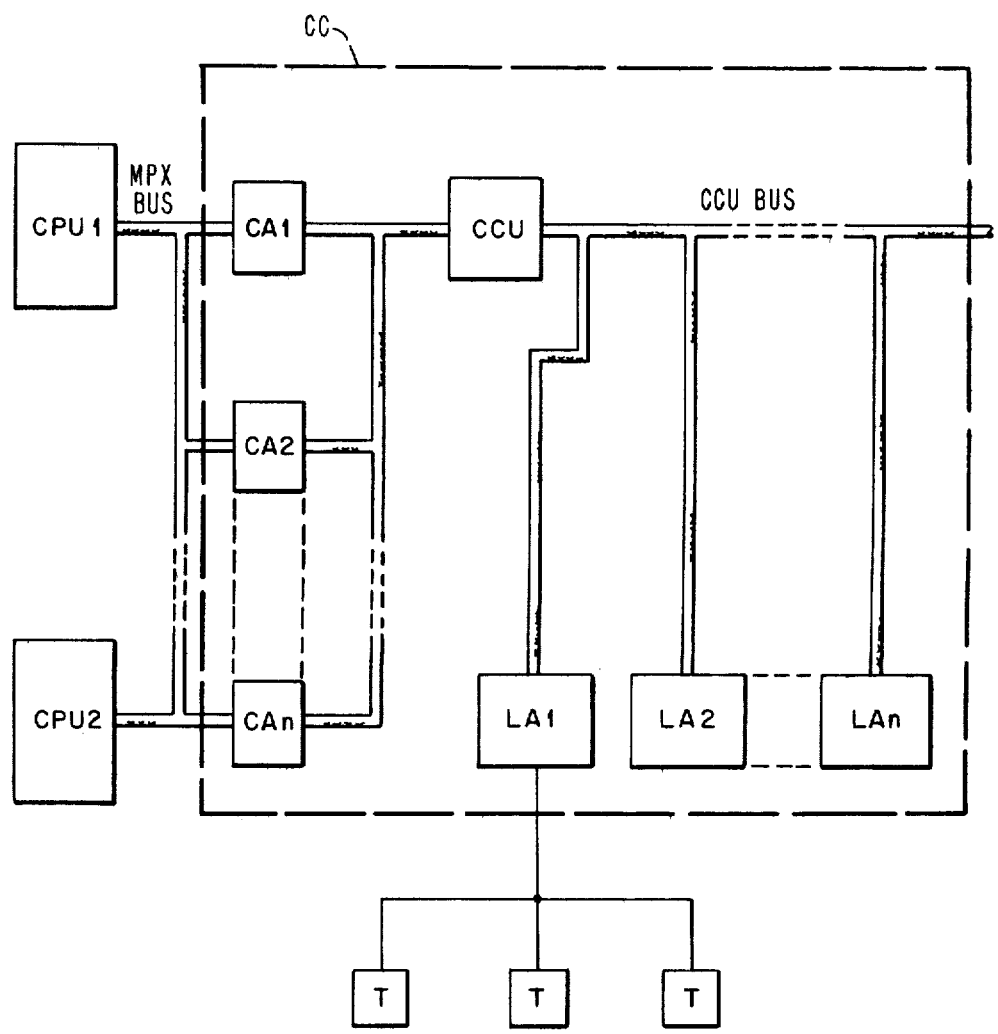
FIG. 1 is a block diagram of a teleprocessing system.

FIG. 1 is a schematic diagram illustrating the architecture of a communication controller (CC) located within a teleprocessing network. The intelligent component of CC, namely, its central control unit (CCU), controls the data being transmitted between several terminals T and central processing units CPU1 and CPU2. The CCU follows previously defined transmission procedures and protocols. The CCU is connected to CPU1 and CPU2 multiplex channels (MPX BUS) through channel adapters CA1, CA2, . . . , CAn, and to the terminals T through line adapters LA1, LA2, . . . , LAn connected to a bus designated CCU BUS. These adapters are combined into groups, two in this example, containing the CAs and the LAs, respectively. Each adapter can process tasks to which different priority levels have been assigned. Any adapter that wants to communicate with the CCU must make a request for service. When the CCU is prepared to grant such requests, it informs the adapters accordingly. When responding, the adapters must comply with the applicable priority rules.

To this end, preselection means are used. These means enable the requests for service that are made within a group of adapters to be updated and used asynchronously to prepare the actual selection of the adapter that will be serviced first.

The preselection means allow the synchronous selection phase to be reduced to a very simple operation since that phase is preceded by an asynchronous preselection phase during which most of the operations for designating the adapter to be serviced first when authorized by the CCU, are carried out.

In the aforementioned patent application, adapters pertaining to a given group are subjected to preselection operations in a serial manner. That is, the adapters interrogate each other, beginning at one end of the group and proceeding sequentially to the other end. The preselection process is initiated by a signal designated TD. The actual selection is initiated by a special command designated TA which is transmitted by the CCU over its bus together with a selection command. Where the time interval between TD and TA is semipermanently less than the duration of the preselection cycle, the prior art method leads to an unstable condition and cannot be carried out efficiently.

To overcome these difficulties and to minimize the potential instability, the present invention discloses a "pyramid" type of architecture.

Accordingly, instead of being preselected serially, the adapters are now combined into subgroups within which preselection operations that are independent of each other are carried out. In parallel therewith, preselection operations are performed between the subgroups until the topmost stage of the pyramid, which is connected to the CCU BUS, is reached.

To this end, each subgroup of adapters is connected to a line driver interface. All such interfaces, which make up a second stage of the pyramid, are combined into subgroups each of which is provided with an independent preselection device. Each subgroup of interfaces in the second stage is itself connected to an interface pertaining to a third stage, and so forth, until the topmost stage of the pyramid is reached, that is, the stage nearest the CCU BUS.

Figure 2:
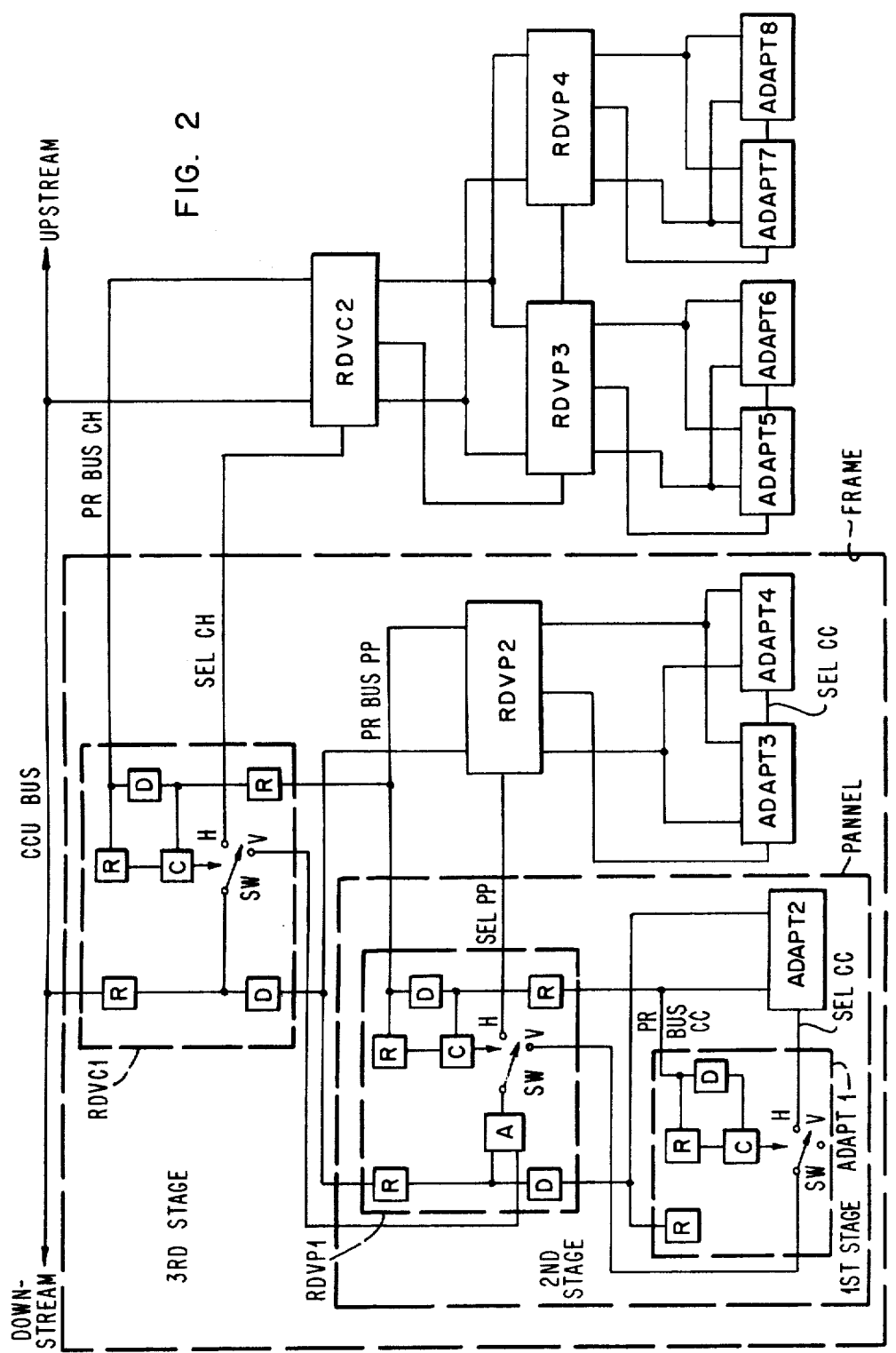
FIG. 2 is a block diagram illustrating how the interfaces are distributed in accordance with the present invention.

FIG. 2 is a schematic illustration of an exemplary embodiment of a three-stage pyramid. Note that in this embodiment the various components have been physically separated. Each interface is disposed on a different card. The cards associated with the adapter interfaces are designated ADAPT and those associated with the line driver interfaces of the second and third stages are designated RDVP and RDVC, respectively. Each subgroup of adapters is disposed on a panel comprising an RDVP interface belonging to the second stage of the pyramid. The various panels are combined into subgroups disposed on frames, each of which includes an RDVC interface belonging to the third stage of the pyramid. Lastly, the third stage is connected to the CCU BUS through a line which receives the signal TA and transmits same to the other cards in the system. Each subgroup of cards (ADAPT, RDVP and RDVC) is provided with preselection means comprising a priority bus (PR BUS) and a selection line (SEL). All of these buses and lines are differentiated from each other by means of the suffixes CC, PP and CH, which denote the first, second and third stages, respectively.

As a result of this organization, the length of any preselection circuit is less than if all cards and been arranged serially in a single circuit in accordance with the teachings of the aforementioned invention. In the present invention, the preselection operations are performed simultaneously and independently within each subgroup.

To enable the system to operate, means for interconnecting the various stages must be provided. The function of these means will be, in particular, to propagate the priority level data from the bottom to the top of the pyramid and the selection commands from the top to the bottom thereof.

Each subgroup of cards is provided with a priority bus (PR BUS) and a line (SEL) to propagate the preselection data serially. Note that the term interface is used herein in its broadest sense and relates to the circuits of an ADAPT type of card as well as to those of a RDVP or RDVC type of card. Each interface also includes receivers (R), drivers (D), a comparator (C) and a switch (SW). However, the ADAPT interfaces are slightly different from the RDVP or RDVC interfaces, as shown in FIGS. 3 and 4.

Figure 3:
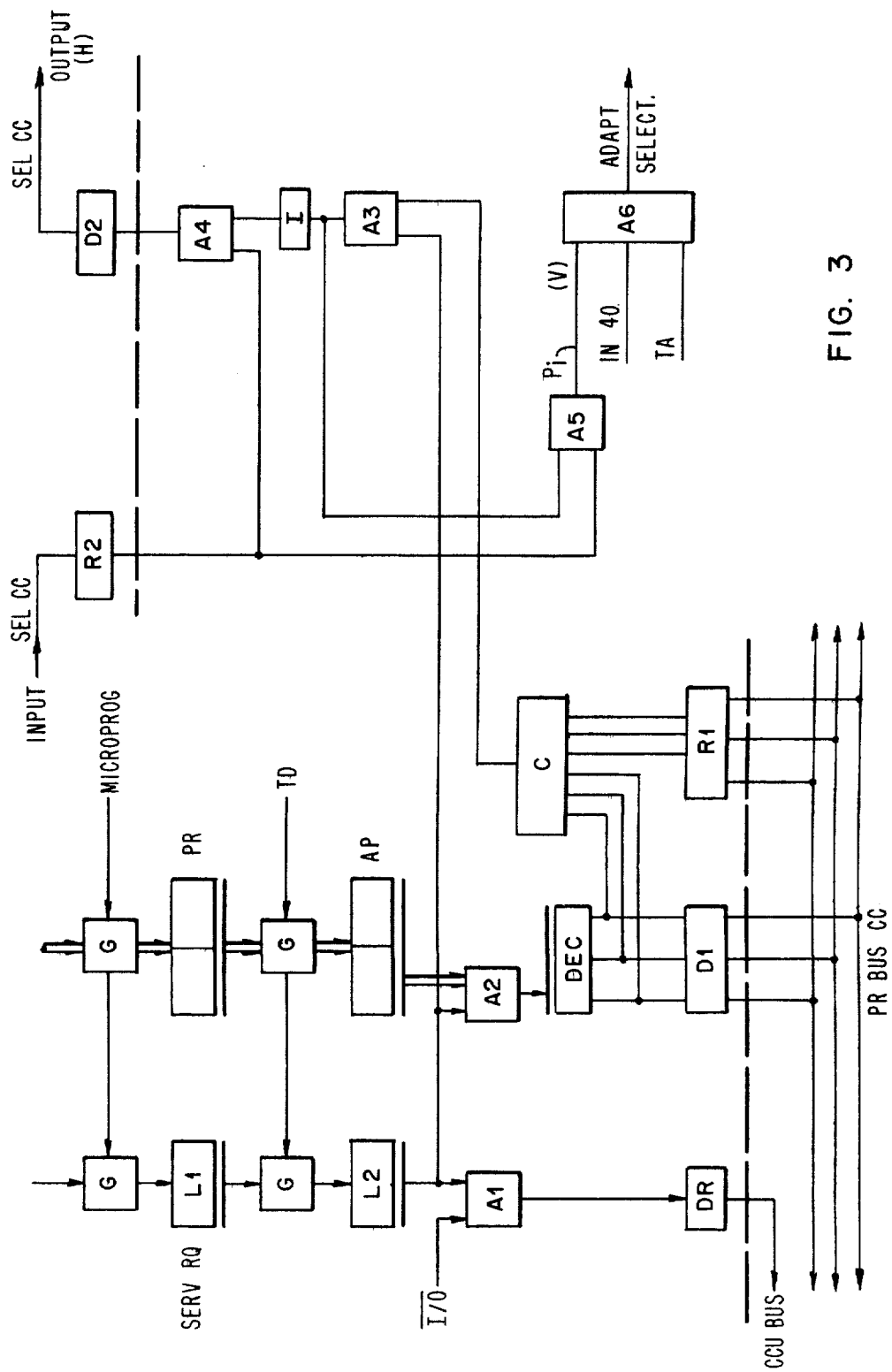
FIGS. 3 and 4 illustrate embodiments of the interface circuits of FIG. 2.
Figure 4:
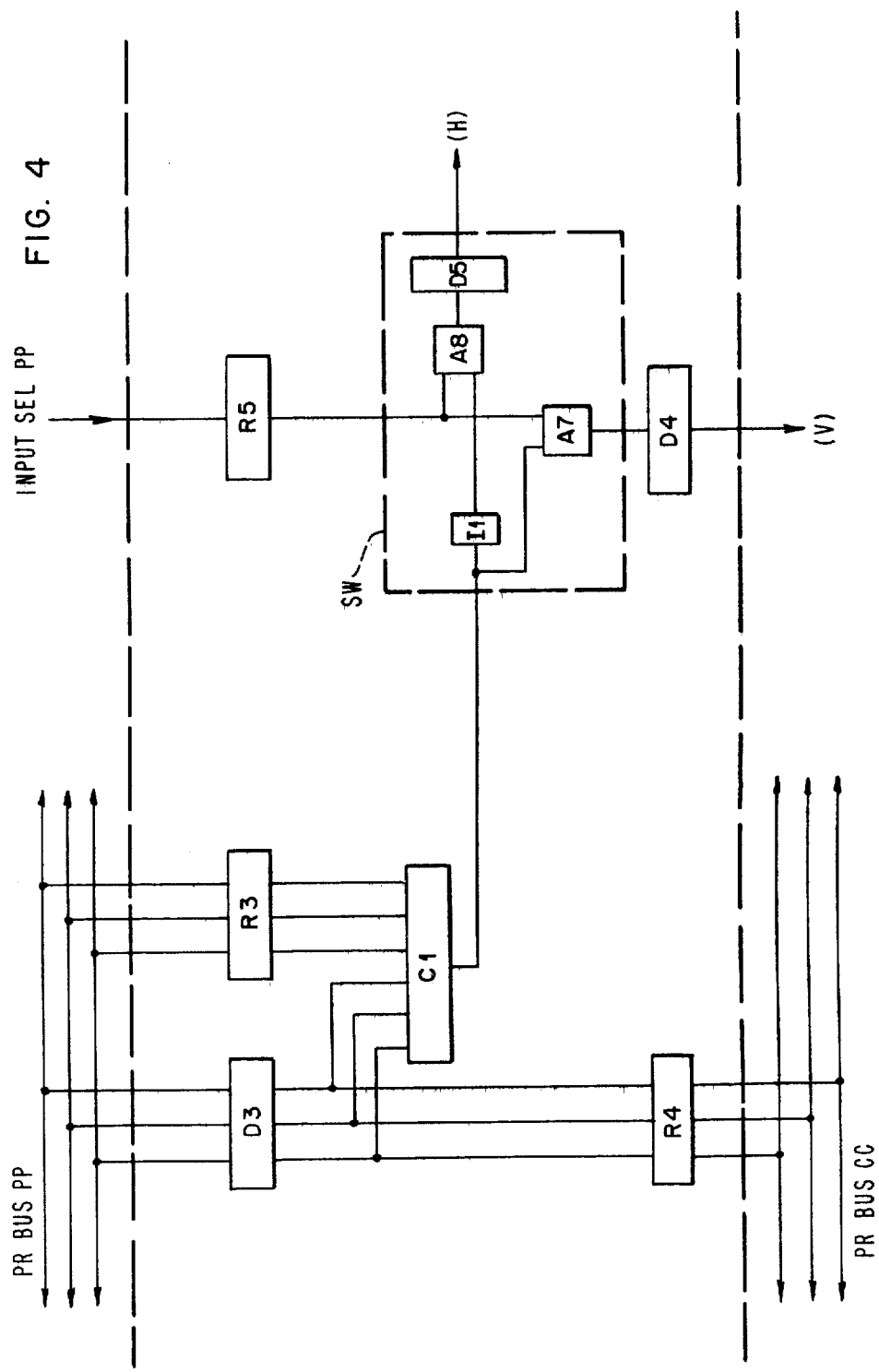

Referring now to FIG. 3, an embodiment of an ADAPT type of interface is shown. A device (not shown) determines the highest of the priority levels associated with the requests for service made by the components connected to this adapter and loads data representative of this level into a register PR. Assuming by way of example that the system has three priority levels, the registers PR will have two bit positions. The register PR is loaded at the same time as a latch L1 is set, in an asynchronous manner relative to the CCU, when a command is received from a microprogram (not shown) which also controls the operation of the adapter. The setting of latch L1 merely indicates the presence of a request for service (SERV RQ). When TD=1, the contents of L1 are transferred to a latch L2 designated adapter service request latch, while the contents of PR are transferred to another register designated AP. Note that in this exemplary embodiment, one of the signals provided for in the conventional procedure governing the signal interchanges between the CCU and the adapters over the CCU BUS and which occurs at a suitable rate has been selected as signal TD. In this case, TD is supplied by the CCU which makes it possible to dispense with a clock and to simplify the operations intended to assure that the contents of AP will not be modified during the actual selection operation. When a line designated CCU BUS input/output (I/O) control line goes low ($\bar{I}/O=1$), the request for service made by the adapter is transmitted to the CCU as a result of gate A1 being enabled. The voltage level required to drive the CCU BUS is supplied by a circuit labeled DR. The adapter's request for service (L2=1) also enables a gate A2, thereby causing the contents of AP to be transmitted to a decoding circuit designated DEC. The circuit has three output lines corresponding to the three priority levels and connected to the PR BUS CC through a driver (D1). The contents of the PR BUS at the adapter concerned and the output of D1 are OR'ed and the resultant data is reshaped by a receiver R1. The output of R1 is logically compared in C with the data provided by DEC. The output of C goes high when the output of DEC indicates the presence of a request for service made by any of the components associated with the adapter concerned and the priority level of which is equal to the highest priority level present on the PR BUS CC.

The output of C is connected to the input of a gate A3 which is enabled by the output of L2. The output of A3 is connected through an inverter I to an AND gate A4. The second input of A4 is connected to the line SEL CC at the input of the ADAPT interface involved, through a receiver R2 that reshapes the pulses received over that line. The output of A4 drives the line SEL CC at the output of the interface through a circuit D2. In addition, the outputs of R2 and A3 are connected to the inputs of another AND gate designated A5. The output of A5 provides the preselection data $P_i$ relating to the adapter of order "i" being considered. This output is connected to one of the three inputs of an AND gate designated A6, the remaining inputs of which receive the signal TA and a so-called selection command signal designated IN 40, respectively. The latter signal results from the decoding of a word supplied by the CCU to indicate its readiness to perform the selection operation and, consequently, that it is available for the purpose of communicating with the adapters. This word is recognized by all adapters in the group, but only the adapter which has been preselected can respond thereto since one of the inputs of A6 is connected to the output of A5. In practice, a latch S, to be described later, may be interposed between A5 and A6.

The operation of the devices used to select an adapter of order "i" within any subgroup is governed by the following logic expressions in which AND and OR logic functions are identified by means of a dot (.) and a plus sign (+), respectively:

(1) $PR_i$ priority level loaded into the register PR. The loading operation is performed at a rate defined (in this example) by the microprogram.

(2) $AP_i$ contents of the register AP.

$$AP_i = PR_i.TD.$$

(3) APB priority levels present on the PR BUS CC.

$$APB = AP'_1 + AP'_2 + \ldots AP'_i + \ldots + AP'_n$$

where "n" is the number of adapters in the subgroup being considered. (Note that in the example illustrated in FIG. 2, n=2) and $AP'_i = AP_i.(\text{SERV RQ})$, since the data contained in the register AP is only placed on the PR BUS CC if SERV RQ=1.

(4) $P_i$ preselection condition $$P_i = (\text{SERV RQ}).SI.(AP'_i = APB)$$

where SI is the logic level on the line SEL CC at the input of the adapter being considered.

(5) SO logic level of the line SEL CC at the output of the adapter being considered.

$$\overline{SO} = SI.[\overline{\text{SERV RQ}} + \text{SERV RQ}.(AP_i < APB)]$$

where APB refers to the highest priority level resulting from $AP'_1 + AP'_2 + \ldots + AP'_i + \ldots + AP'_n$.

Each adapter is also provided with the selection latch S mentioned earlier. After each preselection cycle, the latch S preselected within each subgroup of adapters is set to "1" ($P_i = 1$) while the other latches S are set to "0".

Consequently, the combination of logic circuits A3, A4, A5, A6 and I performs the function of the switch SW shown in ADAPT 1 (see FIG. 2). When SO=1, SW is set to position H, and when $P_i = 1$, it is set to position V. When the signal TA is high all adapters will decode the selection command (IN 40) that the CC may send, but only the adapter for which $P_i = 1$ (and in which S=1) will be selected.

FIG. 4 shows a preselection circuit belonging to an interface in the second stage of the pyramid, but it should be noted that the third stage circuits are similar to this one. Receivers (R3, R4, R5) are used to reshape the signals received at the interface. Circuits (D3, D4, D5) drive the output lines of the interface. A comparator C1 compares the priority levels of the requests for service made by the subgroup of adapters associated with the RDVP interface being considered, with those of the requests made by other subgroups of adapters served by the other RDVPs of the same subgroup of second stage interfaces. A logic set comprising two gates (A7, A8) and an inverter (I1) is used as switch SW and determines the path to the adapter to be serviced; this path may be either vertical (SW being set to position V) or horizontal (SW being set to position H).

The output of C1 is high when the highest priority levels present on PR BUS CC and PR BUS PP are equal. It is low when the highest priority level on PR BUS CC is lower than the highest priority level on PR BUS PP.

The priority levels present on PR BUS PP result from the OR logic function of the priority levels of the requests for service sent through the RDVP interfaces pertaining to the same subgroup of second stage interfaces. Consequently, they correspond to the priority levels of the requests sent through the adapters located on the frame being considered.

To illustrate the operation of the system of the present invention, we shall assume that at a given instant the highest priority levels associated with the requests made by the adapters of FIG. 2 are as follows:

| ADAPT 1 | priority level | one    |
|---------|----------------|--------|
| ADAPT 2 | "              | zero * |
| ADAPT 3 | "              | two ** |
| ADAPT 4 | "              | one    |
| ADAPT 5 | "              | two    |
| ADAPT 6 | "              | one    |
| ADAPT 7 | "              | zero   |
| ADAPT 8 | "              | one    |

Each subgroup performs its preselection operations independently of the other subgroups. Accordingly, the preselections will designate the following in the first stage:

| ADAPT 2. |
|----------|
| ADAPT 4. |
| ADAPT 6. |
| ADAPT 7. |

Therefore, the priority levels transferred to the second stage will be:

| RDVP1 | priority levels | zero and one.  |
|-------|-----------------|----------------|
| RDVP2 | "               | one and two.   |
| RDVP3 | "               | one and two.   |
| RDVP4 | "               | zero and one.  |

* highest priority
** lowest priority in this example

Consequently, the interfaces with the highest priority levels, as designated by means of the second stage preselection operations, will be: RDVP 1 for the subgroup of interfaces (RDVP1, RDVP2) and RDVP4 for the subgroup (RDVP3, RDVP4).

The highest priority levels transferred to the third stage are both zero for RDVC1 and RDVC2. A contention therefore exists. However, since the location of RDVC1 is more downstream than that of RDVC2 on the line SEL CH, RDVC1 will set its switch SW to position V and will be serviced first. Consequently, the path followed by the CCU BUS to the adapter to be serviced first, ADAPT2, will be via RDVC1 and RDVC2. ADAPT2 is also the adapter that would have been serviced if a single preselection system serving adapters ADAPT1-ADAPT8 serially had been used, but the path from the CCU BUS to that adapter would have been longer.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent is:

1. In a system wherein quick CCU to component connection has to be established on a priority basis through a given group of first stage interfaces individually attached to said components making requests for service at different and variable priority levels and a CCU BUS connected to a Central Control Unit (CCU), a selection system for selecting one of said first stage interfaces said selection system including:

means for dividing said groups of first stage interfaces into at least two sub-groups, each of said sub-groups being provided with an asynchronously and independently operating preselection system, said preselection system including:

individual first stage storing means within each first stage interface for storing a data (APi) representative of the priority level of the current service request made to said interface by said attached component;

a first stage sub-group priority bus connected to all the individual storing means of the sub-group for ORing said sub-group stored priority levels and for deriving therefrom an ORed logic sub-group condition APB;

comparing means within each first stage interface, connected to said first stage sub-group priority bus and to said individual first stage interface storing means for generating a preselection logic condition Pi in any first stage interface wherein APi is equal to the highest ORed APB priorities;

a two position individual switch having a so-called vertical position connected to the first stage interface attached component and a so-called horizontal position;

a first stage sub-group selection line having an input and an output;

means for serially connecting said first stage sub-group interfaces to said selection line through said individual switches horizontal positions;

means for switching the switch closest to the selection line input and belonging to the first stage sub-group interface wherein said Pi = 1 to its vertical position, whereby said selection line input is connected to said preselected component;

a second stage interface for interfacing each of said sub-group of first stage interfaces, said second stage interface also having a two position individual switch having a so-called vertical position connected to the interfaced first stage selection line input, and a so-called horizontal position; and also having a second stage priority storing means connected to said interfaced first stage sub-group priority bus for storing at least the highest priority level indication among said ORed logic conditions APB of said interfaced first stage sub-group;

means for dividing the second stage interfaces into at least one second stage sub-group each of said second stage sub-groups being provided with an asynchronously operating second stage preselection system, said second stage preselection system including:

a second stage sub-group priority bus connected to said second stage priority storing means for ORing said second stage sub-group stored priority levels;

second stage compare means within each of said second stage interfaces for comparing said second stage interface stored highest priority level indication with said second stage sub-group priority bus ORed indications, to derive therefrom a second stage preselection logic condition;

a second stage sub-group selection line having an input and an output;

connecting means for connecting said second stage sub-group selection line input to said CCU bus;

means for serially connecting said second stage sub-group interfaces to said second stage sub-group selection line input through their individual switches horizontal positions;

means for switching the second stage sub-group switch closest to the second stage sub-group selection line input to its vertical position under control of said second stage preselection logic condition, whereby said second stage sub-group selection line is connected to said CCU bus through said connecting means;

whereby said preselected component attached to a first stage interface is connected through said first and second stage selection lines to said CCU bus for quick selection upon CCU selection command.

2. A selection system according to claim 1 wherein the CCU selection command is provided to all first stage adapters and is gated with said preselection logic condition Pi.

3. A selection system according to claim 1 wherein said each of said first stage interfaces is connected to a number of components each independently requesting CCU service at a different priority level and means are provided for selecting the highest priority level indication of these current priority levels and for storing said selected level in the attached individual first stage interface.

4. A selection system according to claim 1 wherein said connecting means include third stage interfaces each of which interfaces a second stage sub-group of interfaces, said third stage interfaces being in turn distributed into at least one third stage sub-group of interfaces provided with third stage sub-group preselection means substantially similar to said second stage preselection system.

5. A selection system according to any one of claims 1, 2, 3 or 4 wherein said individual first stage storing means include:

a first register for storing the data representative of the highest priority level of the current service request(s) made by the attached component(s);

a second register;

gating means for gating said first register contents into said second register; and, means for connecting said second register output to said first stage sub-group priority bus and to said first stage sub-group comparing means.

6. A selection system according to claim 5 wherein said first stage switch includes:
- a first gating means connected to said compare means output; and,
- a second gating means having a first input connected to said first gating means output and a second input connected to said CCU BUS for receiving a selection command signal from said CCU;

whereby said first stage adapter component to be selected is selected upon CCU request.

* * * * *